Sept. 22, 1959     A. M. LIPPISCH     2,905,091
FLUID PUMP

Filed May 9, 1956     3 Sheets-Sheet 1

INVENTOR.
ALEXANDER M. LIPPISCH
BY
*Moody & Habecker*
ATTORNEYS

Sept. 22, 1959     A. M. LIPPISCH     2,905,091
FLUID PUMP
Filed May 9, 1956     3 Sheets-Sheet 2
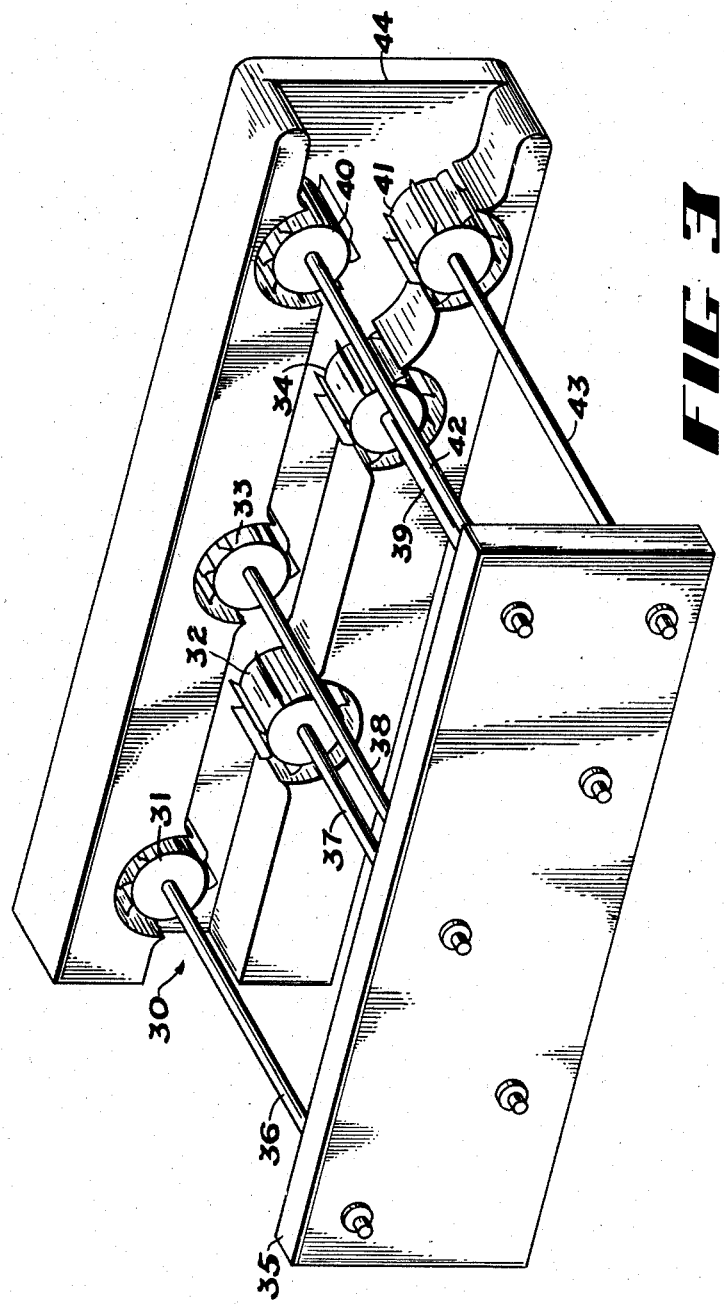
INVENTOR.
ALEXANDER M. LIPPISCH
BY
ATTORNEYS Sept. 22, 1959 — A. M. LIPPISCH — 2,905,091
FLUID PUMP
Filed May 9, 1956 — 3 Sheets-Sheet 3

INVENTOR.
ALEXANDER M. LIPPISCH
BY
*Moody & Habecker*
ATTORNEYS

United States Patent Office

2,905,091
Patented Sept. 22, 1959

2,905,091

FLUID PUMP

Alexander Martin Lippisch, Cedar Rapids, Iowa, assignor to Collins Radio Company, Cedar Rapids, Iowa, a corporation of Iowa Application May 9, 1956, Serial No. 583,852

4 Claims. (Cl. 103—83)

This invention relates to fluid flow devices and more particularly to fluid flow devices utilizing boundary layer control.

Usual blower systems for movement of large masses of air quietly and efficiently have been in the form of centrifugal or squirrel cage types. These types have usually involved circular duct couplings and extra ducting for insertion into a straight duct. Even axial type systems, while capable of insertion directly into a straight duct, have circular duct-coupling sections. Whatever form these blowers have taken has been disadvantageous in that rotational energy is imparted to the fluid moved in addition to the desired translation and energy rise. In circumstances where the rotational energy has been undesirable, the use of extinguishers or straighteners or other forms of devices of this nature has required additional duct length and additional friction loss. Further, transitions between circular and rectangular cross section ducting introduces additional friction loss and a lack of uniformity of flow at each point across the rectangular cross section duct.

Accordingly, it is an object of the invention to provide a uniform flow through rectangular cross section ducting without the losses incurred by rotational motion, either as it is induced or extinguished.

It is a further object of the invention to impart energy to a flow of fluid through a rectangular duct by control of the flow's boundary layers two-dimensionally. This is to say, by control of the boundary layer in its thickness and along the direction of flow.

It is a further object of this invention to provide two-dimensional blowers for use in apertures such as a rectangular slot in a wall.

It is a further object of this invention to utilize two-dimensional control in control of the fluid flow around corners and bends.

It is a feature of this invention that cylindrical rotors are utilized in control of the boundary layer in fluid flow systems.

It is a further feature of the invention that this control of the boundary layer is applicable to rectangular ducts of any length or size or cross section.

Further objects, features, and advantages of the invention will become apparent when read in conjunction with the specification and claims in view of the drawings, in which:

Figure 1:
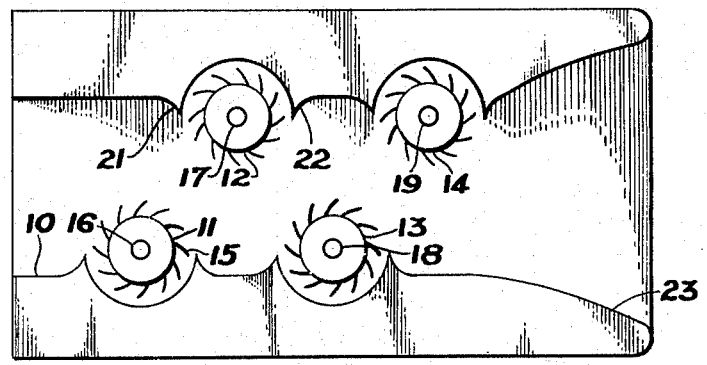
Figure 1 shows a side view of a rectangular duct with one side removed.
Figure 2:
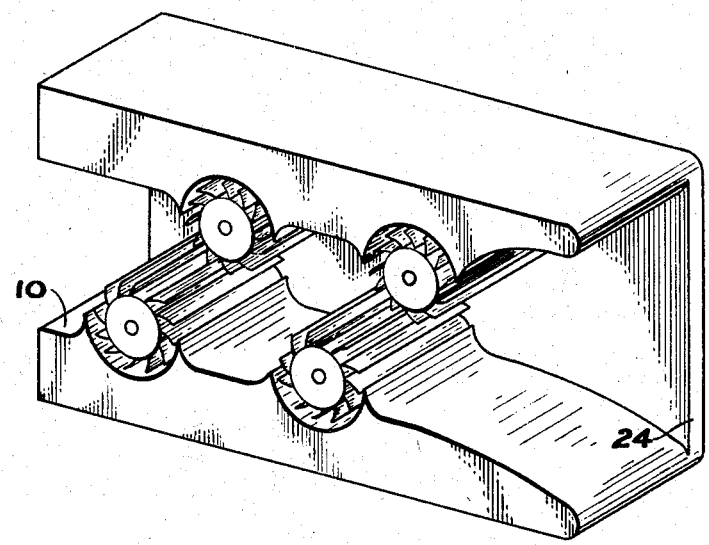
Figure 2 shows a perspective view of Figure 1.
Figures 4, 5:
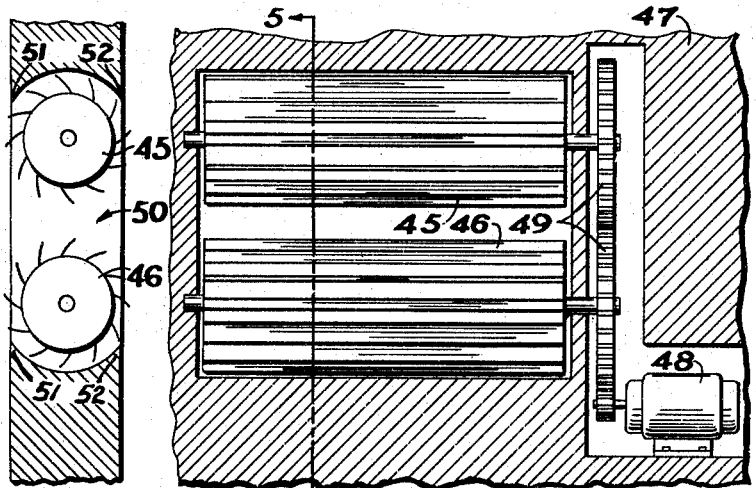
Figure 6:
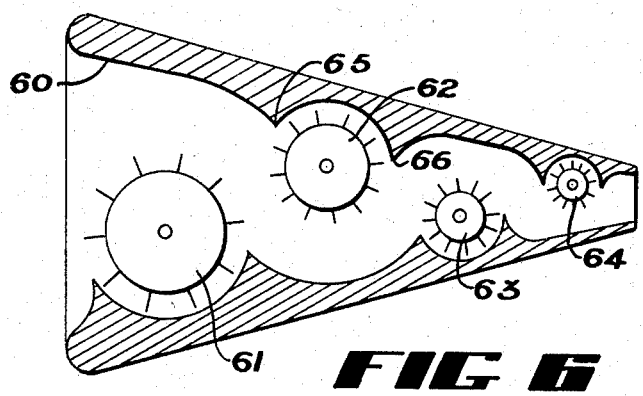
Figures 7, 8:
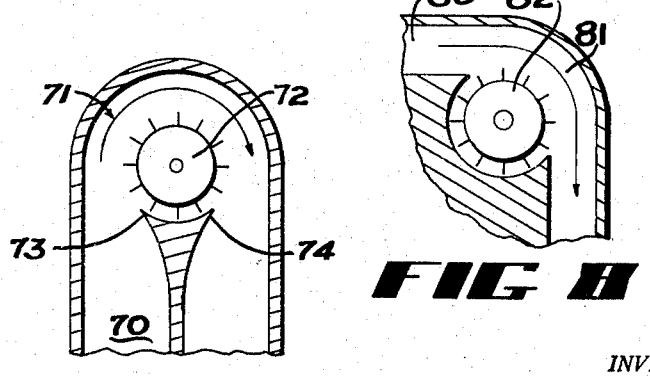

Figure 3 shows a perspective view of an improved version of Figure 2 having more symmetrical out-flow, Figure 4 shows a modification utilizing the output rotors of Figure 3 mounted in a slot in a wall, Figure 5 shows a cross section of Figure 4 along the line 5—5, Figure 6 shows a modification of Figure 1 in a divergent or convergent conduit, Figure 7 shows the application of the invention to a flow reversing duct, and Figure 8 shows the application of the invention to a deviation in direction of fluid flow.

It is to be understood that the term "fluid" is used as generic to air, gas, water, air suspended powders and other substances both compressible and incompressible which are capable of being pumped or of being a power source medium. While the devices described herein are generally capable of the reverse operation, in terms of mechanical energy transfer, that is as a motor, they will be described in operation as pumps for convenience of terminology. It can be easily seen, however, that the devices are equally useful as motors in accord with the skill of the art.

Figure 1 shows a side elevation of a rectangular duct 10 having the near side removed. Mounted in duct 10 are cylindrical rotors 11, 12, 13, and 14 alternately spaced along opposite walls of the rectangular duct. These rotors are cylindrical and extend substantially the full distance between the side walls. Each rotor has mounted thereon fins 15 which may be mounted on an internal cylinder or on end rings similarly to squirrel cage rotors. Consistent with the two-dimensional theory of operation, the width of the duct, and the length of the rotors correspondingly, may be varied without affecting the operation of the device.

In the form shown in Figure 1 each of the rotors is similarly constructed and is driven at substantially the same speed. The rotors are mounted on shafts 16, 17, 18, and 19, respectively, with bearings provided for free rotation of each rotor. A motor may be used for each rotor, or a single motor may be coupled to the set of rotors by belts, chains, gearing, or other forms of rotary coupling.

The shape of the flow through and between these rotors has somewhat of a sinusoidal nature. This is a consequence of the dimension of the channel opposite each rotor being less than that in the absence of a rotor. This ensures a higher pressure gradient across the flow at each rotor and yields a higher efficiency, compared to a relatively straighter path for the fluid flow. The walls of the rectangular channel 10 are provided with extensions 21 and 22 at each side of the rotor, above and below relative to and along the flow of the fluid, to avoid dead regions or points of stagnation. These wall extensions extend parallel to the rotors from side wall to side wall.

The right hand portion of Figure 1 is shown with a divergence 23. This divergence is used for small reductions in fluid velocity and for coupling the device to slightly larger rectangular cross section ducts. The use of the divergence 23 is controlled by the application of the device. In applications where pressure or velocity is the variable which it is desired to control, such variable may be controlled by size changes only on the walls in which the rotors are mounted. By this limitation as to how the size is changed, cross flow or other transverse flow disturbances which arise with changes in width are avoided.

The operation of the device is relatively simple. The rotation of the rotors directly affects the boundary layer of the fluid in duct 10. The boundary layer is given an energy rise at each rotor and so is moved along. Since the boundary layer is given an energy rise, the mass of fluid between the boundaries is thereby induced to flow along the duct. In instances where the device of Figure 1 is used to boost the flow of velocity of a fluid already in motion, the rotors increase the boundary layer energy and overcome the flow loss of the boundary layer. This results in accelerated flow of the fluid being pumped.

It is obvious that use of this boundary layer device as a fluid motor would result in absorption of energy from the fluid flow at the boundary layer. As the flow progresses, further rotors absorb more energy therefrom. In such a case, divergence 23 becomes necessary to permit exit of lower energy fluid from the right end of the device.

Figure 2 shows a perspective view of Figure 1 and illustrates more clearly the two-dimensional aspect of the device. The rectangular duct 10 has two side walls; 24 and the near side wall, which has been removed for ease of illustration of the device. The rotors extend between the side walls of the duct without variation of shape or dimension along the transverse dimension of the flow. The other two dimensions, which are controlled, are the depth of the boundary layer and the dimension along the fluid flow. It is a basic assumption in this device that in the dimension transverse to the fluid flow, there is no variation, such as cross flow.

As a consequence of boundary layer control on the opposite sides of the rectangular ducts through the operation of the rotors, the fluid is induced to move along the duct without having rotational energy induced therein.

Figure 3 shows a perspective view of the device of Figure 2 with an additional pair of rotors added to the output end with the device working as a pump. In Figure 3 rotors 31, 32, 33, and 34 are mounted in rectangular duct 30 in a similar manner to the mounting of rotors 11 through in duct 10 of Figure 1. Shafts 36, 37, 38, and 39 are connected to rotors 31 through 34, respectively, and are connected into gear box 35.

Exit rotors 40 and 41 are placed opposite to each other across the output flow of duct 30. Rotors 40 and 41 are connected to gear box 35 by shafts 42 and 43, respectively. The gear box 35 may be arranged to provide for equal speeds of rotation of each rotor or for increasing speeds of rotation of each rotor progressively toward the outlet to ensure equal loading of each rotor. Motor means is coupled to gear box 35 by any of the well known methods of coupling.

Duct 30 has two side walls; the near wall, which is removed to exhibit the rotors, and the second 44 on the opposite side of the duct. The side walls are substantially straight and smooth so that no cross flow or transverse disturbances occur in the rectilinear flow of the fluid. As in Figure 1 extensions of the walls beside the rotor prevent stagnant points in the flow.

Rotors 31, 32, 33, and 34 of Figure 3 operate in a fashion similar to rotors 11 through 14 of Figure 1. As a pump, rotors 31 to 34 operate on the boundary layer of the fluid flow and provide an energy increase therein. Exit rotors 40 and 41 provide energy boost and, further, by being driven at approximately the same speed, ensure that the exit flow of the fluid is free of rotational momentum. It can be readily seen in Figure 1 that the output flow has a tendency to discharge at a slight angle relative to the normal to the exit opening. The exit rotors in Figure 3 ensure that the boundary of the flow has the same characteristic at opposite points adjacent the exit. Of course, the exit rotors have substantially the same rotational speed to achieve this goal. Where the gear box is arranged to provide for progressively increasing speeds, rotors 40 and 41 have a higher speed than the immediately previous rotor 34 to provide additional energy increase of the fluid.

Figure 4 shows application of the use of rotors 40 and 41 of Figure 3 to movement of fluid through a short rectangular duct in the form of a slot in a wall. This wall slot is between cavities or between the room of a house and outdoors.

In Figure 4 two relatively long cylindrical rotors 45 and 46 are mounted in a long rectangular slot in the wall 47. Rotors 45 and 46 extend the full width of the slot. A motor 48 is also mounted within the wall and provides motive power for the device. Coupling of the rotors to the motor is by any of the usual means such as belts, chains, or, as shown, gearing 49. Rotors 45 and 46 may be also driven separately. By separate control, the two rotors provide control of the discharge path. When the two rotors are driven at unequal speeds, the discharge path will vary from the normal to the slot opening.

Here, as in the previous modifications, control of the boundary layer of the fluid passing through the slot controls the fluid flow.

Figure 5 shows the cross section along line 5—5 of the wall rotors and apertures. The slot 50 has the two rotors 45 and 46 mounted at the edges thereof. Extensions of the wall at 51 and 52 extend into the slot beside the rotors to minimize dead air or stagnation points in the fluid flow.

Figure 6 shows the application of four rotors, analogous to the four rotors of Figure 1, to a convergent rectangular cross section conduit. In conduit 60 a series of cylindrical rotors are mounted. Each rotor is of increasing diameter relative to the prior rotor progressively in the direction of increasing cross section of the duct. The largest rotor 61 is on the large end of the tapered section of 60. Rotors 62, 63, and 64 are progressively smaller and are alternately spaced on opposite sides of the tapered section. Each rotor, as in Figure 1, extends from one side wall to the other. The path for the fluid is somewhat sinuous as it is in Figure 1.

It is to be noted that only the dimension transverse to the rotors reduces in the duct. The width of the duct along the length of the rotor remains constant from one end of the duct to the other. Rotors 61, 62, 63, and 64 are driven at speeds which are appropriate to the flow of fluid past them. Each rotor is protected from stagnation points in the fluid flow by wall extensions such as 65 and 66 about rotor 62. These wall extensions extend the length of each rotor before and after the rotor along the fluid stream. While the device of Figure 1, acting as a pump, serves to move the fluid along and possibly give it a desirable energy boost, the device of Figure 6 as a pump, will act to increase the energy in the fluid greatly as well as transfer the fluid.

The area of the cross section of the duct may be varied in any manner from entrance to exit to suit the application at hand. Thus, a logarithmic decrease, a linear decrease, or an inverse function decrease of area may be used in a particular application. The ratio of speeds and sizes of the rotor may be varied in a similar manner in order to match the change of area of the pump. In applications of the device to conversion of fluid energy to mechanical rotation of a shaft, a high pressure inlet at the right permits the velocity of the fluid to reduce and provide full energy adsorption by the rotors progressively to the left toward the large exit. Thus, the device can be used as a hydraulic turbine for power house use yielding a good efficiency and a low turbulence tail race.

Figure 7 shows boundary layer control of fluid being reversed as to its direction of flow. Conduit 70 is rectangular in cross section. A 180° turn 71 has concentric therewith, rotor 72. Rotor 72 is cylindrical and the long dimension thereof extends from one side wall to the other of channel 70. The walls of channel 70 are extended toward rotor 72 at 73 and 74 to eliminate stagnation points of the fluid flow. A motor, not shown, is used to drive rotor 72 and provide acceleration of the boundary layer at the bend to prevent stalling of the flow therein. It is important that the cross section of the flow of fluid is smallest at the center of the turn so that the necessary pressure gradient across the fluid flow can be obtained. The reversing arrangement of Figure 7 can be utilized in dynamic fluid flow test tunnels to reverse the direction of flow in a closed circuit without introducing rotational energy in the fluid which may vitiate experimental results.

Similarly to Figure 7, Figure 8 shows the application of boundary layer control to turn less than 180° such as the right angle bend illustrated. Here, as in Figure 7, a channel 80 of rectangular section goes around a turn. Mounted adjacent the center of the turn is a rotor 82. The center of the turn 81 is also made the point of least cross section to provide the necessary pressure gradient across the fluid flow. As in Figure 7 the wall adjacent rotor 82 is extended so as to provide obstructions to the formation of stagnation points in the fluid flow.

It is within the scope of this invention to apply the teachings given herein, as to a pair of opposing sides of a rectangular duct providing boundary layer control, to both pairs of surfaces of the duct. The fins on the rotors may, of course, be curved in either direction relative to the rotation of the impeller, or straight radially, depending on the fluid dynamics of the particular application.

Although this invention has been described with reference to particular embodiments thereof, it is not to be so limited because changes and modifications may be made therein which are within the full intended scope of the invention as defined by the appended claims.

I claim:

1. A fluid flow device comprising a rectangular cross section conduit and a plurality of cylindrical impellers, said impellers being placed progressively alternately on opposite sides along said conduit and having portions thereof extending into said conduit, said impellers extending substantially across the sides of said conduit, whereby a substantially sinusoidal fluid flow is induced within said conduit between the extending portions of said impellers.

2. A fluid flow device comprising a rectangular cross-section duct, a cylindrical impeller positioned in a wall of said duct and having a portion thereof extending into said duct, a plurality of impellers alternately positioned on opposite sides of said duct from said first impeller progressively along the flow of said fluid and having portions thereof extending into said duct, said walls extended adjacent said impellers whereby the boundary layer of said fluid adjacent said walls is controlled by said impellers without stagnation points, whereby a substantially sinusoidal fluid flow path is induced within said duct between the extending portions of said impellers.

3. A fluid flow device comprising a rectangular duct, a pair of impellers opposingly mounted in the walls of said duct and projecting slightly thereinto, and a plurality of impellers mounted in the wall of said duct alternately on opposite sides of said duct progressively from said pair of impellers, each of said plurality and said pair of impellers having portions thereof extending into said duct whereby a substantially sinusoidal fluid flow path is induced between said plurality of alternately mounted impellers.

4. The fluid flow device of claim 3 wherein said pair of impellers are driven at substantially the same speed and the remaining plurality of impellers are driven at increasingly lesser speeds progressively from said pair of impellers.

References Cited in the file of this patent

UNITED STATES PATENTS

| | | |
|---|---|---|
| 1,823,579 | Anderson | Sept. 15, 1931 |
| 1,838,169 | Anderson | Dec. 29, 1931 |
| 2,208,890 | Bowers | July 23, 1940 |

FOREIGN PATENTS

| | | |
|---|---|---|
| 2,175 | Great Britain | of 1863 |
| 98,714 | Sweden | Apr. 23, 1940 |
| 830,160 | Germany | Jan. 31, 1952 |